US009767247B1

(12) United States Patent
Lu et al.

(10) Patent No.: US 9,767,247 B1
(45) Date of Patent: Sep. 19, 2017

(54) LOOK-UP TABLE RESTRUCTURING FOR TIMING CLOSURE IN CIRCUIT DESIGNS

(71) Applicant: Xilinx, Inc., San Jose, CA (US)

(72) Inventors: Ruibing Lu, Santa Clara, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 92 days.

(21) Appl. No.: 14/798,269

(22) Filed: Jul. 13, 2015

(51) Int. Cl.
*G06F 17/00* (2006.01)
*G06F 17/50* (2006.01)

(52) U.S. Cl.
CPC ...... *G06F 17/5081* (2013.01); *G06F 17/5045* (2013.01)

(58) Field of Classification Search
USPC .......................................................... 716/113
See application file for complete search history.

(56) References Cited

U.S. PATENT DOCUMENTS

| 7,424,697 | B1* | 9/2008 | Arslan | G06F 17/5031 716/116 |
| 8,984,462 | B1* | 3/2015 | Das | G06F 17/5077 716/113 |
| 2004/0060032 | A1* | 3/2004 | McCubbrey | G06F 17/5054 716/104 |
| 2006/0225021 | A1* | 10/2006 | Padalia | G06F 17/5054 716/117 |
| 2007/0035327 | A1* | 2/2007 | Baeckler | G06F 17/5054 326/38 |
| 2013/0173681 | A1* | 7/2013 | Carlough | G06F 7/5375 708/504 |

OTHER PUBLICATIONS

Singh, Deshanand et al., "Two-Stage Physical Synthesis for FPGAs," Proc. of the 2005 IEEE Custom Integrated Circuits Conference, Sep. 18, 2005, pp. 171-178, IEEE, Piscataway, New Jersey, USA.
Ye, Terry Tao et al., "Physical Synthesis for ASIC Datapath Circuits," Proc. of the 2002 IEEE International Symposium on Circuits and Systems, May 26, 2002, pp. III-365-III-368, vol. 3, IEEE, Piscataway, New Jersey, USA.
Specification and drawings for U.S. Appl. No. 14/671,920, filed Mar. 27, 2015, Lu et al.
Altera, "Netlist Optimizations and Physical Synthesis," Quartus II Handbook Version 13.1, Nov. 2013, vol. 2, Chapter 16, pp. 16-1 to 16-16, Altera Corporation, San Jose, California, USA.
Altera, "Timing Closure and Optimization," Quartus II Handbook Version 13.1, Nov. 2013, vol. 2, Chapter 12, pp. 12-1 to 12-46, Altera Corporation, San Jose, California, USA.

(Continued)

*Primary Examiner* — Mohammed Alam
(74) *Attorney, Agent, or Firm* — Kevin T. Cuenot

(57) ABSTRACT

A method of circuit design may include identifying, using a processor, a timing critical path within a first look-up table structure in a circuit design and restructuring, using the processor, the first look-up table structure into a functionally equivalent second look-up table structure. The second look-up table structure may include fewer look-up tables serially coupled in the timing critical path than the first look-up table structure. The method may include placing, using the processor, the second look-up table structure and routing, using the processor, the second look-up table structure.

18 Claims, 8 Drawing Sheets

(56) References Cited

OTHER PUBLICATIONS

Mischenko, Alan et al., "Boolean Factoring and Decomposition of Logic Networks," Proc. of the 2008 International Conference on Computer-Aided Design, Nov. 10, 2008, pp. 38-44, IEEE Computer Society, Washington DC, USA.
Naseer, A. R. et al., "Direct Mapping of RTL Structures onto LUT-Based FPGA's," IEEE Transactions on Computer-Aided Design of Integrated Circuits and Systems, Jul. 1998, vol. 17, No. 7, pp. 624-631, IEEE, Piscataway, New Jersey, USA.
Roth, J. Paul et al., "Minimization Over Boolean Graphs," IBM Journal of Research and Development, Apr. 1962, vol. 6, Issue 2, pp. 227-238, IBM Corporation, Riverton, New Jersey, USA.
Synopsys, "Synplify Premier," copyright 2011, pp. 1-4, Synopsys, Inc., Mountain View, California, USA.
Ashenhurst, Robert L., "The Decomposition of Switching Functions," Proc. of the International Symposium on the Theory of Switching, Jan. 1, 1957, Part I, vol. XXIX, pp. 74-16, Harvard University Press, Cambridge, Massachusetts, USA.

* cited by examiner

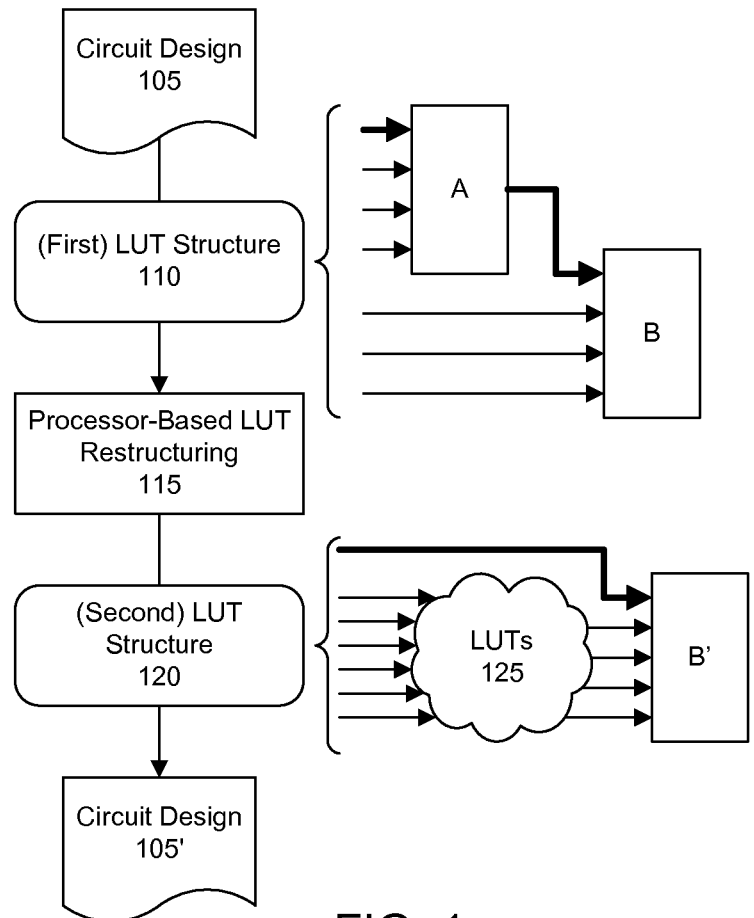
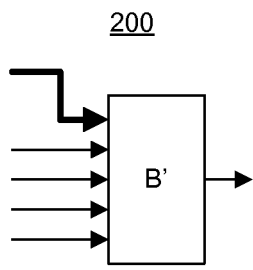
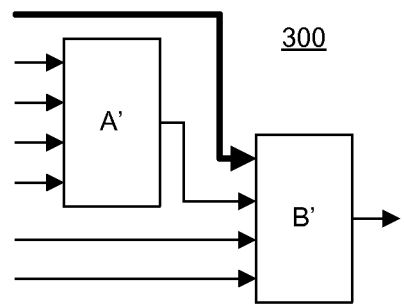
FIG. 1
FIG. 2
FIG. 3

US 9,767,247 B1

LOOK-UP TABLE RESTRUCTURING FOR TIMING CLOSURE IN CIRCUIT DESIGNS

TECHNICAL FIELD

This disclosure relates to integrated circuits (ICs) and, more particularly, to restructuring look-up tables for timing closure in circuit designs.

BACKGROUND

Implementing a circuit design within an integrated circuit (IC), whether a programmable IC or an application specific IC (ASIC), entails processing the circuit design through a design flow. The design flow includes multiple, different stages. These stages generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

Synthesis may also include mapping. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, PIPs, PIP settings, and/or other interconnect circuitry to electrically couple the various circuit blocks of the target IC after placement.

Modern circuit designs often have aggressive timing requirements. Significant time is spent processing the circuit design through the design flow in an attempt to meet these timing requirements. LUTs are frequently used to implement significant portions of a user design. As such, timing critical paths often traverse through one or more LUTs. Available electronic design automation (EDA) tools attempt to improve timing of circuit designs through optimization of LUT structures during synthesis. Because detailed timing information for the circuit design is not available during early stages of the design flow, optimization performed during synthesis relies upon generic timing estimates or crude timing approximations.

As such, these early stage optimization efforts may be less effective than expected. In some cases, the early stage optimization efforts are entirely ineffective. For example, in some cases the portions of the circuit design optimized during synthesis are not the critical portions of the circuit design observed in later stages of the design flow. In other cases, incorrect optimization choices made early in the design flow may result in non-convergence of the circuit design.

SUMMARY

A method of circuit design may include identifying, using a processor, a timing critical path within a first look-up table (LUT) structure in a circuit design and restructuring, using the processor, the first LUT structure into a functionally equivalent second LUT structure. The second LUT structure may include fewer LUTs serially coupled in the timing critical path than the first LUT structure. The method may include placing, using the processor, the second LUT structure and routing, using the processor, the second LUT structure.

A system for circuit design includes a processor programmed to initiate executable operations. The executable operations may include identifying a timing critical path within a first LUT structure in a circuit design and restructuring the first LUT structure into a functionally equivalent second LUT structure. The second LUT structure may include fewer LUTs serially coupled in the timing critical path than the first LUT structure. The method may include placing the second LUT structure and routing the LUT second structure.

A non-transitory computer-readable medium has instructions stored thereon which, when executed by a processor, may perform one or more methods as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 1 is a diagram illustrating an example of LUT restructuring in a circuit design.

FIG. 2 is a block diagram illustrating an exemplary LUT structure for use in restructuring LUT circuitry.

FIG. 3 is a block diagram illustrating another exemplary LUT structure for use in restructuring LUT circuitry.

DETAILED DESCRIPTION

Figure 4:
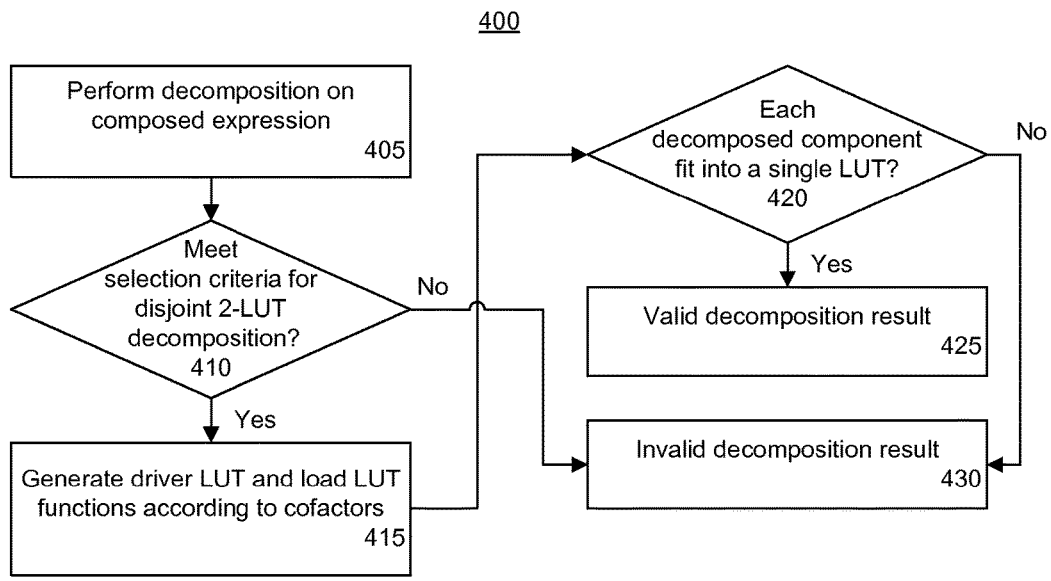
FIG. 4 is a flow chart illustrating an exemplary method of disjoint 2-LUT decomposition.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to restructuring look-up tables (LUTs) for timing closure in circuit designs. In accordance with the inventive arrangements described within this disclosure, a circuit design may be processed through a portion of a design flow. In one example, the circuit design may be placed. In another example, the circuit design may be placed and routed.

The circuit design may be evaluated to identify a timing critical path that traverses through a LUT structure that includes two or more LUTs. Because the circuit design is either placed or both placed and routed, accurate delay information may be determined for paths of the circuit design. The LUT structure, e.g., a first LUT structure, may be restructured into a different, second LUT structure. While structurally different, the first and second LUT structures are functionally equivalent.

In restructuring the first LUT structure, the number of LUTs through which the timing critical path traverses may be reduced, thereby reducing the delay on the timing critical path. In one particular example, the timing critical path may be restructured to flow directly into a load LUT in the second LUT structure. Further aspects of LUT restructuring are described in greater detail with reference to the accompanying drawings.

As defined within this disclosure, the term "path," in the context of a circuit design, refers to a connection between at least two endpoints. Each endpoint of the path is a synchronous, or clocked, circuit element. One or more combinatorial, or un-clocked, circuit elements may be in the path. A path may be formed by a connection between a source and one or more loads of the source of a net. As defined within this disclosure, a "LUT based path" is a path that travels through one or more LUTs as part of the combinatorial logic in a path. LUTs are a type of combinatorial circuit.

As defined within this disclosure, a "timing critical path" is a path of a net of a circuit design that has the largest delay. A timing critical path may have a positive slack or a negative slack. As defined within this disclosure, the term "slack" is the difference between a required arrival time of a signal at a load of a net, as defined by a timing requirement, and an estimated arrival time of the signal at the load. A positive slack indicates that the path meets the timing requirement for the path. A negative slack indicates that the path does not meet the timing requirement for the path. The path is slower than the timing requirement for the path.

The inventive arrangements described within this disclosure may be implemented as a method or process of closing timing for a circuit design using LUT restructuring as performed by a data processing system. In another aspect, the inventive arrangements may be implemented as a data processing system having a processor programmed to execute program code. The processor, upon executing the program code, may initiate executable operations for closing timing of a circuit design using LUT restructuring. In still another aspect, the inventive arrangements may be implemented as a non-transitory computer-readable storage medium storing program code that, when executed, causes a processor and/or a system to perform and/or initiate a method or process of timing closure for a circuit design using LUT restructuring.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a diagram illustrating an example of LUT restructuring in a circuit design. In the example pictured in FIG. 1, circuit design 105 is evaluated by a system, e.g., a data processing system executing an electronic design automation (EDA) application, to estimate timing of paths. Circuit design 105 may be synthesized, or may be placed, or may be both placed and routed.

In one arrangement, the system may identify one or more LUT based timing critical paths of the circuit design. The system may determine a LUT structure 110, e.g., a first LUT structure, including the timing critical path. In one example, the system may select two or more coupled LUTs in the timing critical path. For example, the system may select any instance of a first LUT driving at least a second LUT where a timing critical path traverses through a first LUT and the second LUT. Optionally, the system may select one or more other LUTs in the fanin cone of the selected LUTs as part of LUT structure 110.

In another arrangement, the system may identify one or more LUT based timing critical paths from a received user input specifying such paths to the system. Responsive to a user input specifying one or more LUT based timing critical paths, the system may operate on the LUT based timing critical paths.

As pictured, LUT structure 110 includes two LUTs A and B. In one aspect, LUT structure 110 may represent the entirety of combinatorial logic within the timing critical path. In another aspect, LUT structure 110 may represent only a portion of the combinatorial logic within the timing critical path. In either case, LUT structure 110 includes at least two serially coupled LUTs in that an output of one LUT is provided as an input to at least one other LUT.

In circuit structure 110, LUT B is referred to as the load LUT. In one aspect, the load LUT is the last LUT prior to the load of the net. In another aspect, the load LUT is the last LUT in a serially coupled plurality of LUTs of the LUT structure.

As pictured, LUT A receives four signals as inputs. LUT B receives four signals as inputs. One of the four signals received by LUT B is a signal output from LUT A. For ease of illustration, neither the source of the net providing inputs to LUTs A and B nor the load of the net driven by an output of LUT B is shown. The source and load may be assumed to be synchronous circuit elements.

Within LUT structure 110, the timing critical path is bolded (increased line thickness). The timing critical path enters the top input of LUT A and includes the output of LUT A that is coupled to the top input of LUT B. As noted, a timing critical path may be one that is the slowest path of the net or a path that has a negative slack. In either case, reducing delay on the timing critical path improves the overall delay of the net.

The system performs one or more executable operations collectively referred to as processor-based LUT restructuring 115 on circuit design 105 and, more particularly, on LUT structure 110. In one arrangement, processor-based LUT restructuring 115 may include performing composition where the functionality of LUT structure 110 is combined and expressed as a single expression, e.g., a single Boolean function, referred to herein as the "composed expression."

In some cases, the composed expression may be implemented as a single LUT. In other cases, the composed expression may not fit within a single LUT. Accordingly, the system may perform decomposition where the composed expression is separated into a plurality of components that may fit within single LUTs. Processor-based LUT restructuring 115 generates LUT structure 120, e.g., a second LUT structure. LUT structure 120 is different from LUT structure 110. Further, LUT structure 120 is functionally equivalent to LUT structure 110.

It should be appreciated that the composition and/or decomposition operations result in a change to the netlist of circuit design 105 at least with respect to the portion being restructured. In consequence, the LUT restructuring may include synthesis of the changed portion of the netlist. Further, LUT structure 120 will require placement and routing as described herein in greater detail.

In one arrangement, decomposition may be performed as an exhaustive search that utilizes recursive Shannon Expansion. Shannon Expansion is a process that is generally known to the skilled artisan. In general, Shannon Expansion may be expressed as $f(x_1, x_2, \ldots x_n) = x_i \cdot f_{x_i} + x_i' \cdot f_{x_i}'$. In this example, $f_{x_i}$ is referred to as the positive cofactor on $x_1$, which is acquired by restricting $x_i$ to a logic constant of 1. The negative cofactor on $x_1$ is $f_{x_i}'$ and is acquired by restricting $x_i$ to a logic constant of 0. Any of a plurality of different decomposition techniques, as described within this disclosure, may be used to determine LUT structure 120.

As pictured, LUT structure 120 may include LUT B' as the load LUT. LUT structure 120 may not include any other LUTs or may include one or more other LUTs depicted as LUTs 125. As discussed, circuit design 105 is at least placed and may be both placed and routed. Accordingly, LUT B', being the load LUT, is placed at the same location as the load LUT of LUT structure 110, i.e., LUT B. In the event that additional LUTs are included in LUT structure 120, the other LUTs may be placed by the system.

In the event that circuit design 105 is routed, the system may attempt to re-use prior routing if or when possible. Because load LUT B' is placed at the original, or same, location as load LUT B, the output net may re-use the routing from LUT structure 110. In some cases, input nets of load LUT B' may also use the routing of LUT structure 110. For example, if the mapping of logical pins of LUTs to physical pins of LUTs have not changed, routing for the unchanged pins from LUT structure 110 may be re-used.

In the example of FIG. 1, the timing critical path is now coupled directly to LUT B' instead of traversing through one or more other LUTs. Thus, the number of LUTs through which the timing critical path travels is reduced by at least one LUT. While LUT B' may be placed at a same location as LUT B, it should be appreciated that since the signals provided to LUT B' are different than those of LUT B, the logic function implemented by LUT B' is also different than the logic function implemented by LUT B. Circuit design 105' includes LUT structure 120 in place of LUT structure 110. Circuit design 105' may be placed and routed as described within this disclosure.

In restructuring a LUT circuitry that includes a timing critical path, the system may restructure the LUTs into one or more different, functionally equivalent LUT structures. FIGS. 2, 3, 6, and 9 illustrate examples of different LUT structures that may be used for restructuring LUT circuitry.

FIG. 2 is a block diagram illustrating an exemplary LUT structure 200 for use in restructuring LUT circuitry. LUT structure 200 is an example of a circuit structure that may be generated by performing composition on an expression represented by a LUT structure including a timing critical path. LUT structure 200 is an example of a single LUT structure.

In one example, the system may restructure a LUT structure that has a number of inputs less than or equal to a maximum number of inputs that may be coupled to a LUT as LUT structure 200. For purposes of illustration, a LUT may have up to six inputs. In that case, a LUT structure formed of two or more LUTs and that has six or fewer inputs to the various LUTs (e.g., after composition) may be restructured into a single LUT as represented by LUT structure 200. As pictured, the composition results in the timing critical path, shown in bold, being provided directly to the new load LUT B'. Load LUT B' may be located at the same location as the load LUT of the LUT circuitry being restructured prior to restructuring.

FIG. 3 is a block diagram illustrating another exemplary LUT structure 300 for use in restructuring LUT circuitry. LUT structure 300 is another example of a circuit structure that may be generated by performing composition on an expression represented by a LUT structure including a timing critical path. The composed expression may be decomposed resulting in LUT structure 300. LUT structure 300 may be used for a disjoint 2-LUT decomposition. LUT structure 300 is a 2-LUT decomposition since 2 LUTs are used. LUT structure 300 is disjoint since there are no shared inputs between inputs of LUT A' and LUT B'. In other words, any signal provided to inputs of LUT A', which may be referred to as a driver LUT, is only provided to inputs of LUT A' and does not also couple to an input of LUT B'. In the example of FIG. 3, the timing critical path, shown in bold, is coupled directly to load LUT B'. Load LUT B' may be located in the same location as load LUT B prior to restructuring. LUT A' may be placed by the system.

FIG. 4 is a flow chart illustrating an exemplary method 400 of disjoint 2-LUT decomposition. Method 400 may be performed by a data processing system (system) as described within this disclosure. Method 400 may be performed to determine whether LUT circuitry including a timing critical path may be restructured using the LUT structure of FIG. 3. Method 400 may begin in a state where the expression implemented by the LUT circuitry being restructured is composed resulting in a composed expression.

In block 405, the system may perform decomposition on the composed expression. The decomposition results in a decomposed expression. For example, the system may recursively perform Shannon Expansion for a set of input pins of the composed expression that are to be assigned to the load LUT in the resulting, or second, LUT structure. In one arrangement, decomposition as described in R. Ashenhurst, "The Decomposition of Switching Functions", Proceedings of the International Symposium on the Theory of Switching, April 1957, pps. 74-116 (1957); and/or in Roth, et al., "Minimization Over Boolean Graphs", IBM Journal, pps. 227-238 (April 1962) may be performed by the system.

In block 410, the system may determine whether the selection criteria for disjoint 2-LUT decomposition is met. For example, the system may compare the components of the decomposed expression with LUT structure selection criteria (selection criteria). In the case of disjoint 2-LUT decomposition, the selection criteria may be whether the non-constant functions of the cofactors of the decomposed expression are either a function or the inverse of that function. If the components of the decomposed expression meet the selection criteria for disjoint 2-LUT decomposition, i.e., the non-constant functions of the cofactors are a function or an inverse of the function, method 400 may continue to block 415. If not, method 400 may proceed to block 430.

In block 415, the system may generate driver LUT and load LUT functions according to the cofactors. The driver LUT and load LUT functions are the logical functions that would be implemented by, e.g., programmed into, the respective LUTs in the LUT structure for disjoint 2-LUT decomposition.

In block 420, the system may determine whether each component to be implemented by a single LUT fits into a single LUT. For example, the system may determine whether the number of inputs available in a single LUT are not exceeded by the number of inputs required for to implement the component within each respective LUT. For the purposes of block 420, constants are not counted as inputs. Further, a function and the inverse of the function count as one input as opposed to two for the purposes of block 420.

If each component fits into a single LUT, method 400 may continue to block 425. In block 425, the system may determine that a valid decomposition result has been found. The resulting disjoint 2-LUT decomposition may be stored as a candidate LUT structure for use in LUT restructuring. It should be appreciated that each decomposition determined to be valid may specify a particular implementation of LUT structure 300. In block 430, the system may determine that an invalid decomposition result has been obtained. In that case, the decomposition result is not utilized or considered a candidate for use in LUT restructuring.

Method 400 is presented as one example of disjoint 2-LUT decomposition. It should be appreciated that method 400 may be repeated, as may be required, to determine whether other sets of input pins for assignment to the load LUT results in a valid decomposition result (candidate). Any candidate LUT structures may be stored for subsequent consideration in LUT restructuring.

Figure 5:
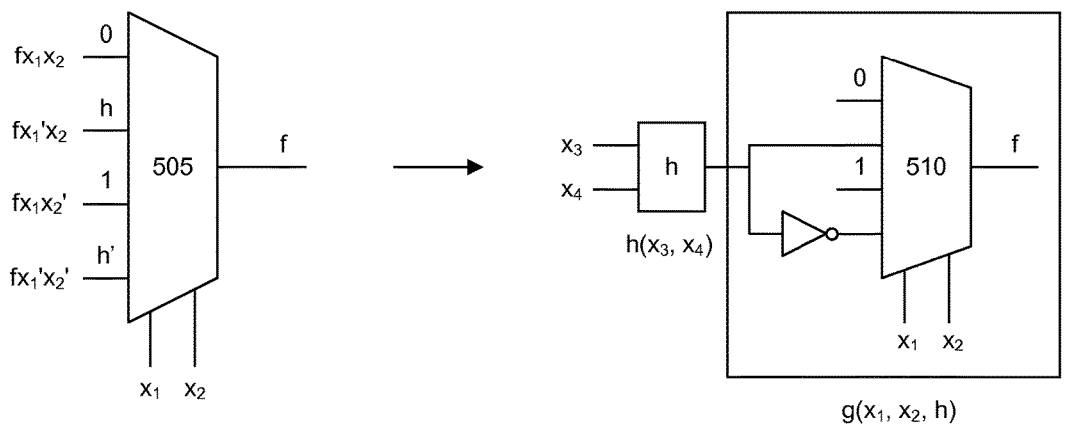
FIG. 5 is a block diagram illustrating an example of disjoint 2-LUT decomposition.

FIG. 5 is a block diagram illustrating an example of disjoint 2-LUT decomposition. As discussed, in order to restructure LUT circuitry as LUT structure 300, the system may perform decomposition and determine whether the result satisfies criteria for implementing a disjoint 2-LUT structure. The system may determine whether disjoint decomposition is possible for a given input pin partition to the load LUT.

Referring to the example of FIG. 5, the composed expression $f(x_1, x_2, x_3, x_4)$ is illustrated on the left using multiplexer 505. The composed expression is decomposed into $g(x_1, x_2, h(x_3, x_4))$ on the right which uses a function circuit block "h" and a multiplexer 510. As illustrated, the inputs provided to multiplexer 505, i.e., the non-constant functions of the cofactors, reduce to h and h', which may be represented in the decomposed expression as $h(x_3, x_4)$ and the inverted version thereof as inputs to multiplexer 510. The criteria for using a disjoint 2-LUT structure as described with reference to FIGS. 3 and 4 is met since each value other than h and h' is a constant.

Figure 6:
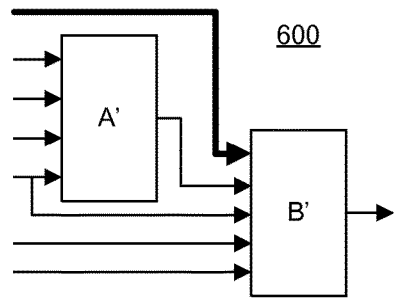
FIG. 6 is a block diagram illustrating another exemplary LUT structure for use in restructuring LUT circuitry.

FIG. 6 is a block diagram illustrating another exemplary LUT structure 600 for use in restructuring LUT circuitry. LUT structure 600 is another example of a circuit structure that may be generated by performing composition on an expression represented by a LUT structure including a timing critical path. The composed expression may be decomposed resulting in LUT structure 600. LUT structure 600 is an example that may be used for a non-disjoint 2-LUT decomposition. LUT structure 600 is a 2-LUT decomposition since 2 LUTs are used. LUT structure 600 is non-disjoint since there is at least one signal shared, or provided to both, an input of LUT A', referred to as the driver LUT, and an input of LUT B'. In other words, at least one signal provided to an input of LUT A' (i.e., the bottom input signal) is also provided to an input of LUT B'. In the example of FIG. 6, the timing critical path, shown in bold, is coupled directly to an input of load LUT B'. Load LUT B' may be located in the same location as the load LUT of the LUT circuitry being restructured. Driver LUT A' may be placed by the system.

Figure 7:
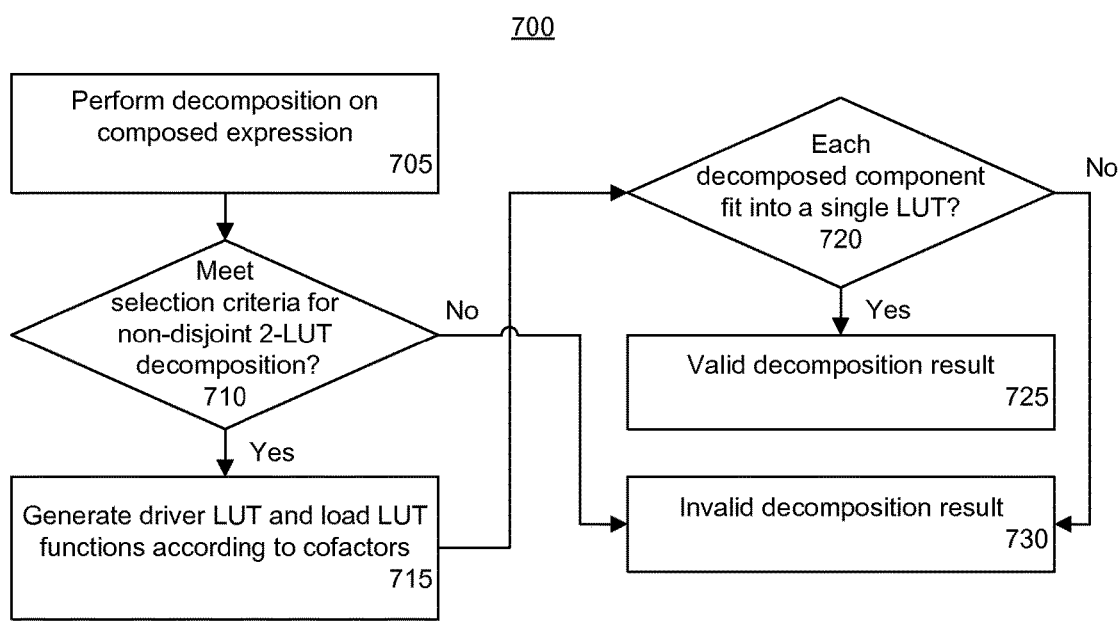
FIG. 7 is a flow chart illustrating an exemplary method of non-disjoint 2-LUT decomposition.

FIG. 7 is a flow chart illustrating an exemplary method 700 of non-disjoint 2-LUT decomposition. Method 700 may be performed by a data processing system (system) as described within this disclosure. Method 700 may be performed to determine whether LUT circuitry including a timing critical path may be restructured using the LUT structure of FIG. 6. Method 700 may begin in a state where the expression implemented by the LUT circuitry being restructured is composed resulting in a composed expression.

In block 705, the system may perform decomposition on the composed expression. The decomposition results in a decomposed expression. For example, the system may recursively perform Shannon Expansion for a set of input pins to be assigned to the load LUT in the resulting, or second, LUT structure. In one arrangement, decomposition as described in Mishchenko, et al., "Boolean Factoring and Decomposition of Logic Networks", Proceedings of International Conference on Computer-Aided Design, November 2008, (2008) may be performed by the system.

In block 710, the system may determine whether the selection criteria for non-disjoint 2-LUT decomposition is met. For example, the system may compare the components of the decomposed expression with selection criteria. In the case of non-disjoint 2-LUT decomposition, the selection criteria may be whether the cofactors have no more than $2^s$ non-constant functions and inversions of such non-constant functions, where the function and its inversion count as 1, and where s is an integer value specifying a number of shared pins. In the case of non-disjoint 2-LUT decomposition, the assignment permits overlapping, whereas overlap in disjoint 2-LUT decomposition is not permitted. If the components of the decomposed expression meet the selection criteria for non-disjoint 2-LUT decomposition, i.e., there are no more than $2^s$ non-constant functions and inversions of such functions in the cofactors, method 700 may continue to block 715. If not, method 700 may proceed to block 730.

In block 715, the system may generate driver LUT and load LUT functions according to the cofactors. The driver LUT and load LUT functions are the logical functions that would be implemented by, e.g., programmed into, the respective LUTs in the LUT structure for non-disjoint 2-LUT decomposition.

In block 720, the system may determine whether each decomposed component to be implemented by a single LUT fits into a single LUT. For the purposes of block 720, constants are not counted as inputs. Further, a function and the inverse of the function count as one input as opposed to two for the purposes of block 720. If each decomposed component fits into a single LUT, method 700 may continue to block 725. In block 725, the system may determine that a valid decomposition result has been found. The resulting non-disjoint 2-LUT decomposition may be stored as a candidate LUT structure for use in LUT restructuring. Each decomposition determined to be valid may specify a particular implementation of LUT structure 600. In block 730, the system may determine that an invalid decomposition result has been obtained. In that case, the decomposition result is not utilized or considered a candidate for use in LUT restructuring.

Method 700 is presented as one example of non-disjoint 2-LUT decomposition. It should be appreciated that method 700 may be repeated, as may be required, to determine whether other sets of input pins for assignment to the load LUT result in a valid decomposition result (candidate). Any candidate LUT structures may be stored for subsequent consideration in LUT restructuring.

Figure 8:
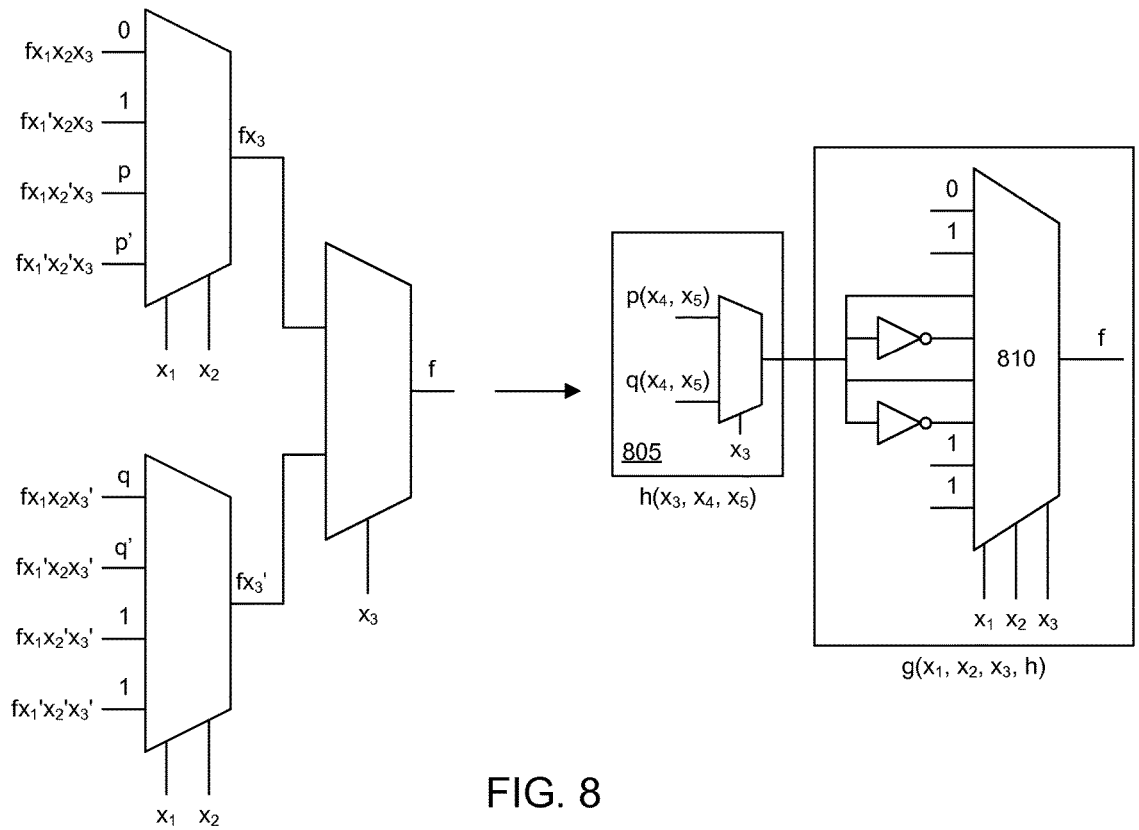
FIG. 8 is a block diagram illustrating an example of non-disjoint 2-LUT decomposition.

FIG. 8 is a block diagram illustrating an example of non-disjoint 2-LUT decomposition. In order to restructure LUT circuitry as a non-disjoint 2-LUT structure, the system may perform decomposition and determine whether the result satisfies criteria for implementing a non-disjoint 2-LUT structure. The system may determine whether non-disjoint decomposition is possible for a given assignment of input pins to the load LUT. The example of FIG. 6 illustrates a decomposition of $f(x_1, x_2, x_3, x_4, x_5)$ into $g(x_1, x_2, x_3, h(x_3, x_4, x_5)$ with one overlapping pin (s=1). Each function and the inverted version of a function count a one. In the example of FIG. 8, the resulting output from circuit block 805 is used to supply four inputs to multiplexer 810. The four inputs include h and h'.

Figure 9:
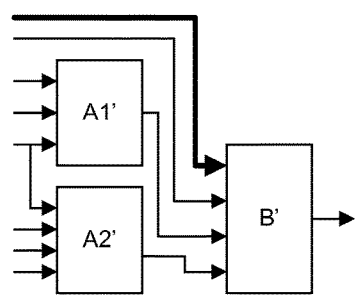
FIG. 9 is a block diagram illustrating another exemplary LUT structure for use in restructuring LUT circuitry.

FIG. 9 is a block diagram illustrating another exemplary LUT structure 900 for use in restructuring LUT circuitry. LUT structure 900 is an example of a circuit structure that may be generated by performing composition on an expression represented by a LUT structure including a timing critical path. The composed expression may be decomposed resulting in LUT structure 900. LUT structure 900 may be used for a 3-LUT decomposition. In the example of FIG. 9, the timing critical path, shown in bold, is coupled directly to an input of load LUT B' and bypasses driver LUTs A1' and A2'. Load LUT B' may be located in the same location as load of the LUT circuitry being restructured. LUTs A1' and A2' may be placed by the system.

Figure 10:
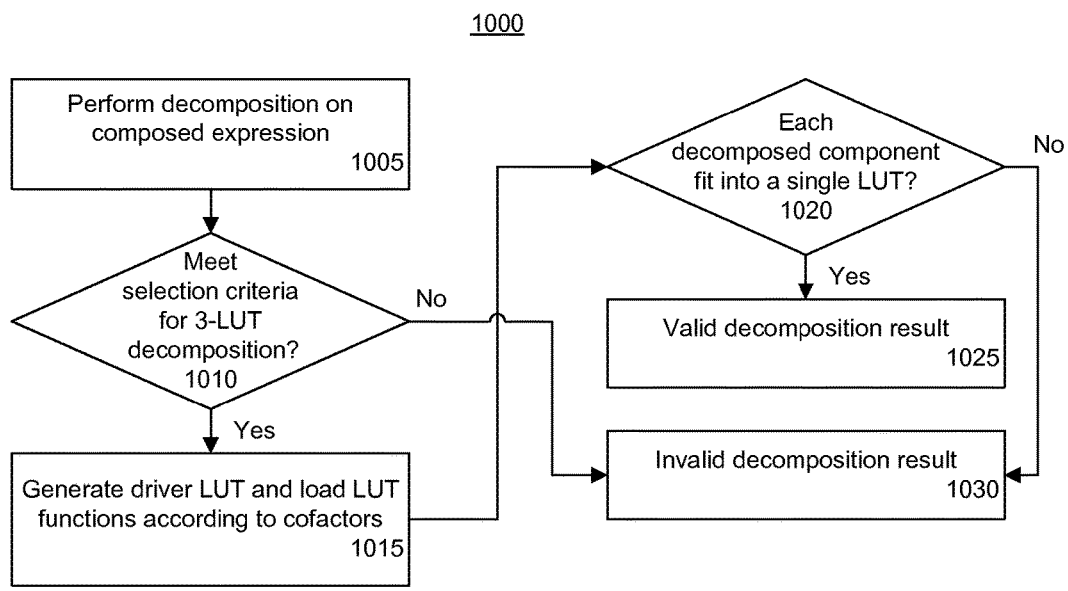
FIG. 10 is a flow chart illustrating an exemplary method of 3-LUT decomposition.

FIG. 10 is a flow chart illustrating an exemplary method 1000 of 3-LUT decomposition. Method 1000 may be performed by a data processing system (system) as described within this disclosure. Method 1000 may be performed to determine whether LUT circuitry including a timing critical path may be restructured using the LUT structure 900 of FIG. 9. Method 1000 may begin in a state where the expression implemented by the LUT circuitry being restructured is composed resulting in a composed expression.

In block 1005, the system the system may perform decomposition on the composed expression. The decomposition results in a decomposed expression. For example, the system may recursively perform Shannon Expansion for a set of input pins to be assigned to the driver LUTs. In one arrangement, decomposition as described in Roth, et al., "Minimization Over Boolean Graphs", IBM Journal, pps. 227-238 (April 1962) may be performed by the system.

In block 1010, the system may determine whether the selection criteria for 3-LUT decomposition is met. For example, the system may compare the components of the decomposed expression with selection criteria. In the case of 3-LUT decomposition, the selection criteria may be that the number of cofactors does not exceed $2^n$, where n is an integer value specifying the number of driver LUTs. Thus, the in case of 3-LUT decomposition, n=2 so the number of cofactors may not exceed 4. In the case of 3-LUT decomposition, each constant of 1 or 0 and each function and its inversion are each treated individually (e.g., where cofactors of 0, 1, h, and h' count as 4 cofactors). If the components of the decomposed expression meet the selection criteria for 3-LUT decomposition, i.e., there are no more than $2^n$ cofactors, method 1000 may continue to block 1015. If not, method 1000 may proceed to block 1030.

In block 1015, the system may generate driver LUT and load LUT functions according to the cofactors. The driver LUT and load LUT functions are the logical functions that would be implemented by, e.g., programmed into, the respective LUTs in the 3-LUT structure. In block 1020, the system determines whether each decomposed component to be implemented by a single LUT fits into a single LUT. Block 1020 may be performed using an encoding process generally known in the art. If each component fits into a single LUT, method 1000 may continue to block 1025.

In block 1025, the system may determine that a valid decomposition result has been found. The resulting 3-LUT decomposition may be stored as a candidate LUT structure for use in LUT restructuring. Each decomposition determined to be valid may specify a particular implementation of LUT structure 900. In block 1030, the system may determine that an invalid decomposition result has been obtained. In that case, the decomposition result is not utilized or considered a candidate for use in LUT restructuring.

Method 1000 is presented as one example of 3-LUT decomposition. It should be appreciated that method 1000 may be repeated, as may be required, to determine whether other sets of input pins for assignment to the driver LUTs result in a valid decomposition result (candidate). Any candidate LUT structures may be stored for subsequent consideration in LUT restructuring.

Figure 11:
FIG. 11 is a block diagram illustrating near timing critical path handling during LUT restructuring.

FIG. 11 is a block diagram illustrating near timing critical path handling during LUT restructuring. LUT structure 1105 includes a timing critical path shown in bold. LUT structure 1105 further includes a near timing critical path 1110 shown in dashed line. As defined within this disclosure, the term "near timing critical path" is a path that has a delay within a predetermined amount of delay of a timing requirement. Referring to LUT structure 1105, for example, path 1110 may have a positive slack. If moved during restructuring to traverse through an additional LUT, e.g., to traverse through both LUT A' and LUT B', path 1110 may become timing critical. As a result of such a move during restructuring, the slack of path 1110 may become negative. In the alternative, path 1110 may become the path of the net with the largest delay. In some cases, if path 1110 is changed during restructuring, the delay of the path 1110 may become worse than the original timing critical path shown in bold.

LUT structure 1115 is the restructured implementation of LUT structure 1105. As pictured, the number of LUTs in the timing critical path is reduced since the timing critical path now flows directly into an input of LUT B'. Further, path 1110 is left unchanged. Any near timing critical paths on the load LUT, e.g., LUT B, remain on the load LUT in the restructured LUT circuitry. Thus, in LUT structure 1115, path 1110 remains on load LUT B'.

FIG. 11 illustrates another aspect of restructuring relating to the use of logical pins and physical pins of a LUT. The system may assign particular signals to logical pins of a LUT. In this example, LUT B has 4 logical pins that may be referred to as A, B, C, and D. LUT B also has 4 physical pins that may be referred to as 1, 2, 3, and 4. During placement, the system may assign logical pins to physical pins of the LUTs. The system may also change this assignment during routing. The system may assign logical pins to physical pins as A-1, B-2, C-3, and D-4, or vary the assignment as may be required.

In the example of FIG. 11, the logical pin of path 1110 on LUT B' has changed. It should be appreciated that the physical pin of path 1110 may be the same in LUT structure 1115 as in LUT structure 1105. If preserving the physical pin of the near timing critical path is possible, then the routing of the near timing critical path will remain the same. More particularly, path 1110 may be routed the same in LUT structure 1105 as in LUT structure 1115. This means that the routing of path 1110 in LUT structure 1105 may be reused in LUT structure 1115. Further, since the placement of LUT B' is the same as the placement of LUT B, the routing coupling LUT B' to other downstream nodes of the net does not change. This means that the routing that couples the output of LUT B to other nodes in LUT structure 1105 may be reused for LUT B' in LUT structure 1115.

Figure 12:
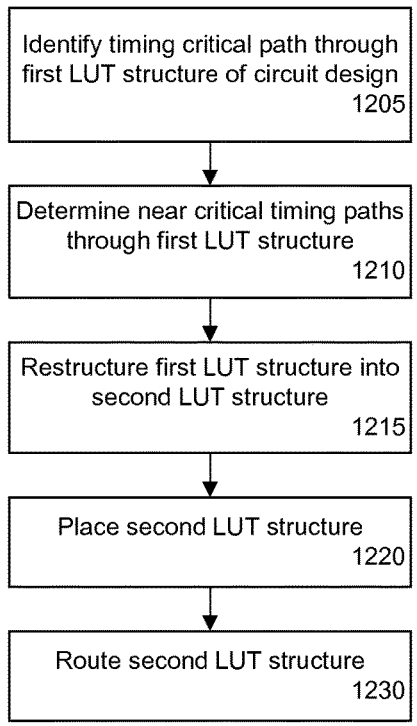
FIG. 12 is a flow chart illustrating an exemplary method of closing timing for a circuit design using LUT restructuring.

FIG. 12 is a flow chart illustrating an exemplary method 1200 of closing timing for a circuit design using LUT restructuring. Method 1200 may be performed by a data processing system (system) as described within this disclosure. In one aspect, method 1200 may begin in a state where the circuit design has been synthesized. In another aspect, method 1200 may begin in a state where the circuit design has been placed. In yet another aspect, method 1200 may begin in a state where the circuit design has been both placed and routed.

In block 1205, the system may identify a timing critical path through a first LUT structure of the circuit design. In one arrangement, the system may identify a timing critical path through a first LUT structure automatically. For example, the system may perform a timing analysis on the circuit design and automatically detect a timing critical path through at least two LUTs where a first LUT drives at least a second LUT in the first LUT structure. In another arrangement, the system may identify a timing critical path through a first LUT structure from a received user input selecting the timing critical path. In block 1210, the system may determine any near timing critical paths through the first LUT structure.

In block 1215, the system may restructure the first LUT structure into a second LUT structure. The system may use the second LUT structure in the circuit design in place of the first LUT structure. The second LUT structure is functionally equivalent to the first LUT structure.

In one arrangement, the second LUT structure may be determined from performing composition on an expression implemented by the first LUT structure resulting in a composed expression. The composed expression may be compared to selection criteria to determine the second LUT structure. For example, the second LUT structure may be LUT structure 200 of FIG. 2.

In another arrangement, the second LUT structure may be determined from performing decomposition on the composed expression. The decomposed expression, or components thereof, may be compared to selection criteria to determine the second LUT structure. For example, the second LUT structure may be LUT structure 300 of FIG. 3, LUT structure 600 of FIG. 6, and/or LUT structure 900 of FIG. 9.

Since the netlist defining the first circuit structure is different from the netlist defining the second circuit structure, in block 1220, the system may place the second LUT structure. As discussed, the load LUT of the second LUT structure may be placed at the same location as the load LUT in the first LUT structure. The system may need to place the driver LUTs of the second LUT structure. In another aspect, as part of placement, the system may maintain the pin mapping of any near timing critical paths on the load LUT if possible.

In block 1225, the system may route the second LUT structure. Any routing portion that has not changed from the first circuit structure may be reused in the second circuit structure, thereby reducing computation time and increasing time to completion of the routing process. For example, routing of unchanged near timing critical paths may be reused. Further, routing from the load LUT to downstream circuit components may be reused.

Figure 13:
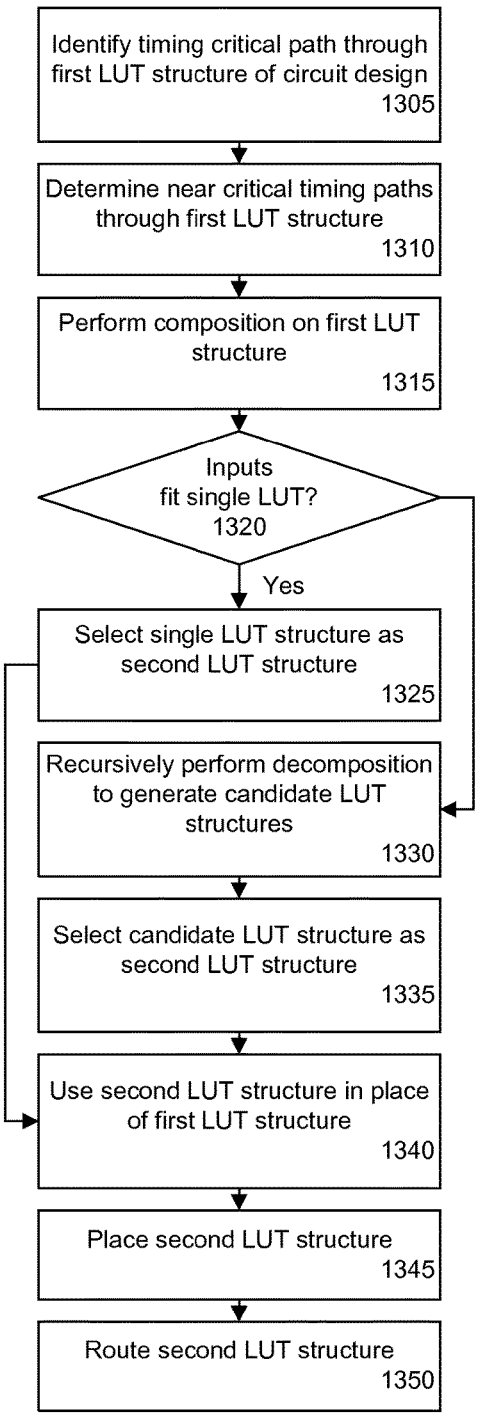
FIG. 13 is a flow chart illustrating another exemplary method of closing timing for a circuit design using LUT restructuring.

FIG. 13 is a flow chart illustrating another exemplary method 1300 of closing timing for a circuit design using LUT restructuring. FIG. 13 illustrates a more complex timing closure methodology. Method 1300 may be performed by a data processing system (system) as described within this disclosure. In one aspect, method 1300 may begin in a state where the circuit design has been synthesized. In another aspect, method 1300 may begin in a state where the circuit design has been placed. In yet another aspect, method 1300 may begin in a state where the circuit design has been both placed and routed.

In block 1305, the system may identify a timing critical path through a first LUT structure of the circuit design. In one arrangement, the system may identify a timing critical path through a first LUT structure automatically as described within this disclosure through timing analysis. In another arrangement, the system may identify a timing critical path through a first LUT structure from a received user input selecting the timing critical path. In block 1310, the system may determine any near timing critical paths through the first LUT structure.

In block 1315, the system may perform composition on the first LUT structure. As discussed, the system may perform composition on an expression implemented by the first LUT structure to generate a composed expression (e.g., a single Boolean function) representing the first LUT structure. In block 1320, the system may determine whether the number of inputs to the composed expression will fit into a single LUT. For example, if the maximum number of inputs to a LUT is "N," where N is an integer value, the number of inputs to the composed expression (e.g., the number of variables) must be N or fewer. If the number of inputs is N or fewer, method 1300 may continue to block 1325. If the number of inputs to the composed expression is greater than N, the composed expression may not be implemented in a single LUT; and, method 1300 may continue to block 1330.

In block 1325, the system selects a single LUT structure as the second LUT structure. For example, the system may select a LUT structure the same as, or similar to, that described with reference to FIG. 2 as the second LUT structure.

In block 1330, the system may recursively perform decomposition to generate candidate LUT structures. As discussed, the system may perform an exhaustive search using recursive Shannon Expansion. The system may recursively generate decomposed expressions using one or more or each of the decompositions illustrated in FIGS. 4, 7, and/or 10. In one arrangement, each of FIGS. 4, 7, and 10 may be performed recursively to generate candidate LUT structures. In performing the decompositions, the system may reduce the number of LUTs in the timing critical path. Further, the system may leave near timing critical paths unchanged.

In block 1335, the system may select a candidate LUT structure as the second LUT structure. In one arrangement, the system may use priority based selection where simpler LUT structures (e.g., LUT structures with fewer LUTs) are selected over more complex LUT structures (e.g., LUT structures having more LUTs). In illustration, a candidate LUT structure having a single LUT may be selected over other more complex candidate LUT structures. A candidate LUT structure for disjoint 2-LUT decomposition may be selected over a candidate LUT structure for non-disjoint 2-LUT decomposition and a candidate LUT structure for 3-LUT decomposition. A candidate LUT structure for non-disjoint 2-LUT decomposition may be selected over a candidate LUT structure for 3-LUT decomposition.

In another arrangement, the system may use a timing cost methodology to select among candidates LUT structures. For example, the system may assign each pin of the first LUT structure a timing cost based on the timing criticality of the pin in the first LUT structure. For the candidate LUT structures, the system may sum the timing costs of the pins on the driver LUTs. The system may select the candidate LUT structure that has the lowest summed timing cost. The timing cost methodology described may be used independently, e.g., on its own, or in combination with the priority-based methodology described above. For example, timing cost methodology may be used to select among a plurality of candidate LUT structures for a same type of decomposition (e.g., a plurality of different candidate LUT structures for disjoint 2-LUT decomposition, a plurality of different candidate LUT structures for non-disjoint 2-LUT decomposition, and/or a plurality of different candidate LUT structures for 3-LUT decomposition).

In block 1340, the system may use the second LUT structure in the circuit design in place of the first LUT structure. In one arrangement, blocks 1315, 1320, 1325, 1330, 1335, and/or 1340 may be referred to as restructuring.

In using the second LUT structure, the netlist of the circuit design changes. For example, the netlist defining the first circuit structure is different from the netlist defining the second circuit structure. Accordingly, in block 1345, the system may place the second LUT structure. As discussed, the load LUT of the second LUT structure may be placed at the same location as the load LUT in the first LUT structure. The system may need to place the driver LUTs of the second LUT structure. In another aspect, as part of placement, the system may maintain the pin mapping of any near timing critical paths on the load LUT if possible.

In block 1350, the system may route the second LUT structure. Any routing portion that has not changed from the first circuit structure may be reused in the second circuit structure, thereby reducing computation time and increasing time to completion of the routing process. For example, routing of unchanged near timing critical paths may be reused. Further, routing from the load LUT to downstream circuit components may be reused.

Figure 14:
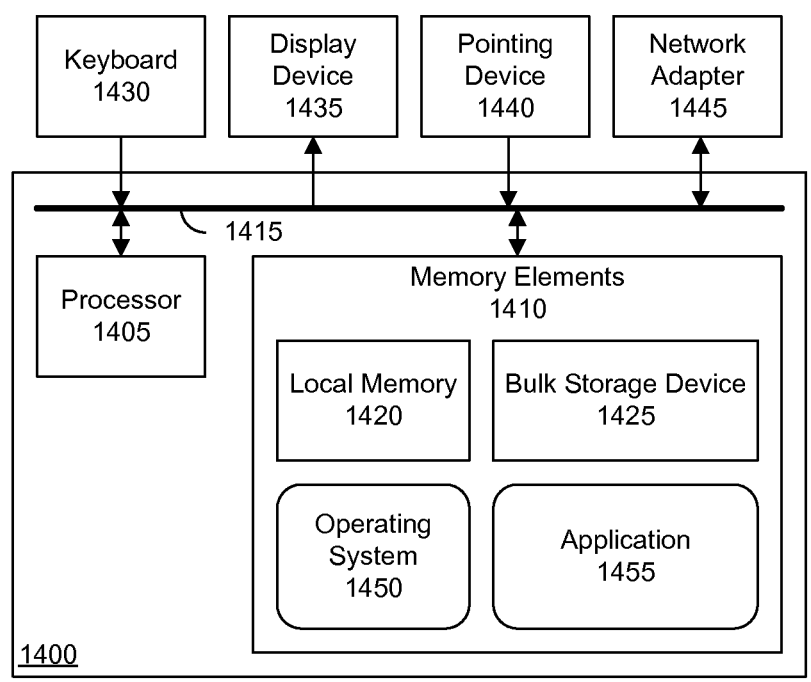
FIG. 14 is a block diagram illustrating an exemplary data processing system.

FIG. 14 is a block diagram illustrating an exemplary data processing system (system) 1400. System 1400 may be used to perform the various operations described within this disclosure relating to LUT restructuring.

As pictured, system 1400 includes at least one processor, e.g., a central processing unit (CPU), 1405 coupled to memory elements 1410 through a system bus 1415 or other suitable circuitry. System 1400 stores computer readable instructions (also referred to as "program code") within memory elements 1410. Memory elements 1410 may be considered an example of computer readable storage media. Processor 1405 executes the program code accessed from memory elements 1410 via system bus 1415.

Memory elements 1410 may include one or more physical memory devices such as, for example, a local memory 1420 and one or more bulk storage devices 1425. Local memory 1420 refers to random access memory (RAM) or other non-persistent memory device(s) generally used during actual execution of the program code. Bulk storage device 1425 may be implemented as a hard disk drive (HDD), solid state drive (SSD), or other persistent data storage device. System 1400 may also include one or more cache memories (not shown) that provide temporary storage of at least some program code in order to reduce the number of times program code must be retrieved from bulk storage device 1425 during execution.

Input/output (I/O) devices such as a keyboard 1430, a display device 1435, a pointing device 1440, and one or more network adapters 1445 may be coupled to system 1400. The I/O devices may be coupled to system 1400 either directly or through intervening I/O controllers. In some cases, one or more of the I/O devices may be combined as in the case where a touchscreen is used as display device 1435. In that case, display device 1435 may also implement keyboard 1430 and pointing device 1440. Network adapter 1445 may be used to couple system 1400 to other systems, computer systems, remote printers, and/or remote storage devices through intervening private or public networks. Modems, cable modems, Ethernet cards, and wireless transceivers and/or radios are examples of different types of network adapter 1445 that may be used with system 1400. Depending upon the particular implementation of system 1400, the specific type of network adapter, or network adapters as the case may be, will vary.

As pictured in FIG. 14, memory elements 1410 may store an operating system 1450 and one or more applications 1455. Application 1455, for example, may be an EDA application. In one aspect, operating system 1450 and application 1455, being implemented in the form of executable program code, are executed by system 1400 and, in particular, by processor 1405. As such, operating system 1450 and application 1455 may be considered an integrated part of system 1400. Operating system 1450, application 1455, and any data items used, generated, and/or operated upon by system 1400 are functional data structures that impart functionality when utilized by system 1400.

In one aspect, system 1400 may be a computer or other device that is suitable for storing and/or executing program code. System 1400 may represent any of a variety of computer systems and/or devices that include a processor and memory and that are capable of performing the operations described within this disclosure. In some cases, the particular computer system and/or device may include fewer components or more components than described. System 1400 may be implemented as a single system as shown or as a plurality of networked or interconnected systems each having an architecture the same as, or similar to, that of system 1400.

Figure 15:
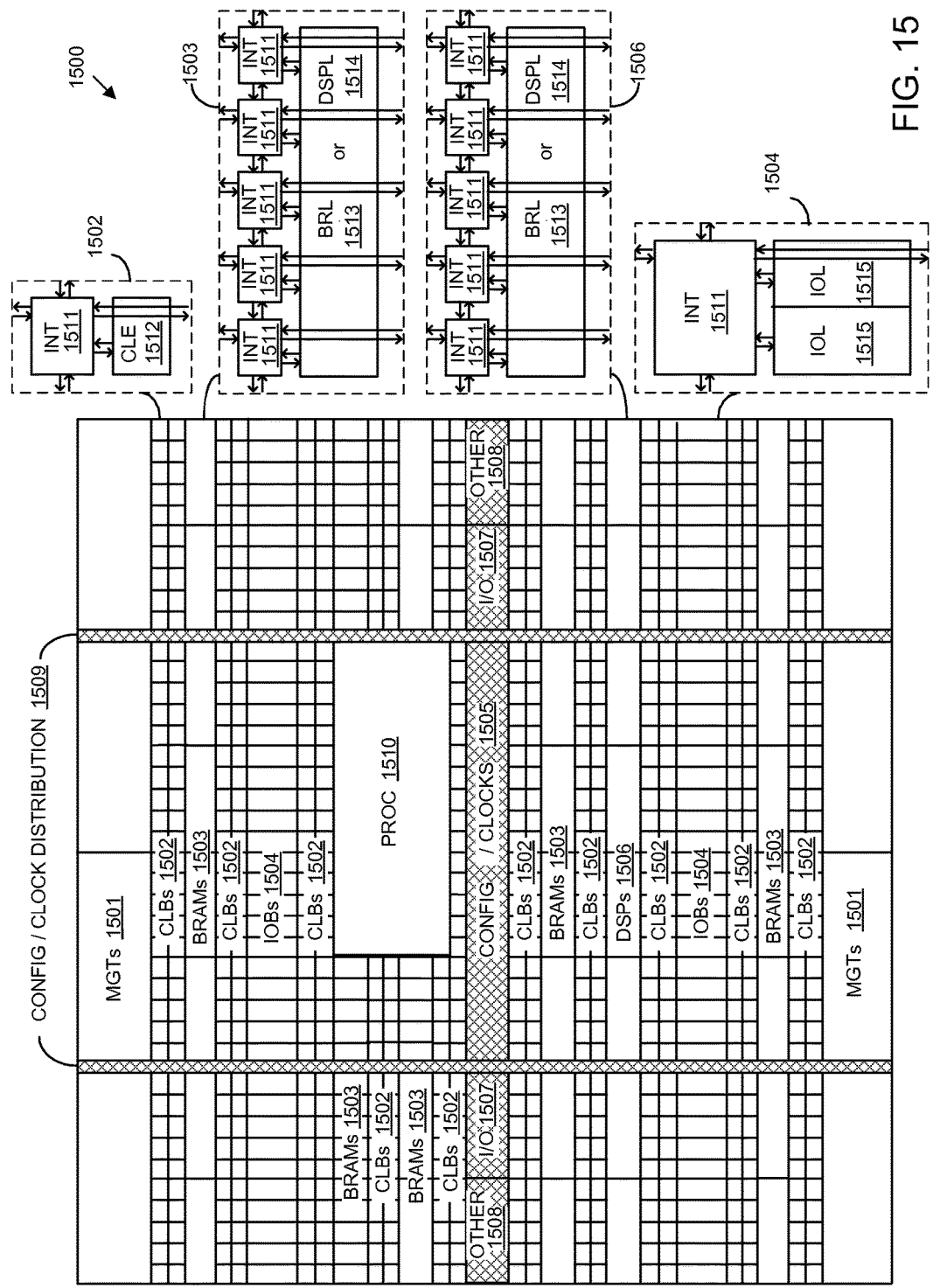
FIG. 15 is a block diagram illustrating an exemplary architecture for an integrated circuit (IC).

FIG. 15 is a block diagram illustrating an exemplary architecture 1500 for an IC. Architecture 1500 may be used to implement a circuit design as described within this disclosure.

In one aspect, architecture 1500 may be implemented within a programmable IC. For example, architecture 1500 may be used to implement a field programmable gate array (FPGA). Architecture 1500 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1500 includes several different types of programmable circuit, e.g., logic, blocks. For example, architecture 1500 may include a large number of different programmable tiles including multi-gigabit transceivers (MGTs) 1501, configurable logic blocks (CLBs) 1502, random access memory blocks (BRAMs) 1503, input/output blocks (IOBs) 1504, configuration and clocking logic (CONFIG/CLOCKS) 1505, digital signal processing blocks (DSPs) 1506, specialized I/O blocks 1507 (e.g., configuration ports and clock ports), and other programmable logic 1508 such as digital clock managers, analog-to-digital converters, system monitoring logic, and so forth. CLBs 1502 may include one or more LUTs.

In some ICs, each programmable tile includes a programmable interconnect element (INT) 1511 having standardized connections to and from a corresponding INT 1511 in each adjacent tile. Therefore, INTs 1511, taken together, implement the programmable interconnect structure for the illustrated IC. Each INT 1511 also includes the connections to and from the programmable logic element within the same tile, as shown by the examples included at the top of FIG. 15.

For example, a CLB 1502 may include a configurable logic element (CLE) 1512 that may be programmed to implement user logic plus a single INT 1511. In one aspect, CLE 1512 may be implemented as, or include, one or more LUTs. A BRAM 1503 may include a BRAM logic element (BRL) 1513 in addition to one or more INTs 1511. Typically, the number of INTs 1511 included in a tile depends on the height of the tile. As pictured, a BRAM tile has the same height as five CLBs, but other numbers (e.g., four) also may be used. A DSP tile 1506 may include a DSP logic element (DSPL) 1514 in addition to an appropriate number of INTs 1511. An IOB 1504 may include, for example, two instances of an I/O logic element (IOL) 1515 in addition to one instance of an INT 1511. The actual I/O pads connected to IOL 1515 may not be confined to the area of IOL 1515.

In the example pictured in FIG. 15, a columnar area near the center of the die, e.g., formed of regions 1505, 1507, and 1508, may be used for configuration, clock, and other control logic. Horizontal areas 1509 extending from this column may be used to distribute the clocks and configuration signals across the breadth of the programmable IC.

Some ICs utilizing the architecture illustrated in FIG. 15 include additional logic blocks that disrupt the regular columnar structure making up a large part of the IC. The additional logic blocks may be programmable blocks and/or dedicated circuitry. For example, a processor block depicted as PROC 1510 spans several columns of CLBs and BRAMs.

In one aspect, PROC 1510 may be implemented as dedicated circuitry, e.g., as a hardwired processor, that is fabricated as part of the die that implements the programmable circuitry of the IC. PROC 1510 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1510 may be omitted from architecture 1500 and replaced with one or more of the other varieties of the programmable blocks described. Further, such blocks may be utilized to form a "soft processor" in that the various blocks of programmable circuitry may be used to form a processor that can execute program code as is the case with PROC 1510.

FIG. 15 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 15 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1510 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "executable operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

In some instances, the term "signal" may be used within this disclosure to describe physical structures such as terminals, pins, signal lines, wires. In other instances, the term "signal" may be used to refer to particular values specified by a wire. The term "signal" may refer to the conveyance of a single bit, e.g., a single wire, or the conveyance of multiple parallel bits through multiple parallel wires. Further, each signal may represent bi-directional communication between two, or more, components connected by the signal.

A computer program product may include a computer readable storage medium (or media) having computer readable program instructions thereon for causing a processor to carry out aspects of the inventive arrangements described herein. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of circuit design may include identifying, using a processor, a timing critical path within a first look-up table (LUT) structure in a circuit design and restructuring, using the processor, the first LUT structure into a functionally equivalent second LUT structure. The second LUT structure may include fewer LUTs serially coupled in the timing critical path than the first LUT structure. The method may include placing, using the processor, the second LUT structure and routing, using the processor, the second LUT structure.

Restructuring the first LUT structure may include performing composition on an expression implemented by the first LUT structure generating a composed expression.

Restructuring the first LUT structure may include determining that a number of inputs for the composed expression is less than a maximum number of inputs for a LUT and selecting a single LUT structure as the second LUT structure.

Restructuring the first LUT structure may include performing decomposition on the composed expression generating a decomposed expression and, responsive to determining that non-constant functions of cofactors of the decomposed expression are either a function or an inversion of the function, selecting a LUT structure for disjoint 2-LUT decomposition as the second LUT structure.

Restructuring the first LUT structure may include performing decomposition on the composed expression generating a decomposed expression and, responsive to determining that cofactors of the decomposed expression have a number of non-constant functions and inversions of the non-constant functions not exceeding $2^s$, where s is a number of shared pins, selecting a LUT structure for non-disjoint 2-LUT decomposition as the second LUT structure.

Restructuring the first LUT structure may include performing decomposition on the composed expression generating a decomposed expression and, responsive to determining that a number of cofactors of the decomposed expression does not exceed $2^n$, where n is an integer value specifying a number of driver LUTs, selecting a LUT structure for a 3-LUT decomposition as the second LUT structure.

In one aspect, the circuit design may be synthesized. In another aspect, the circuit design may be at least placed, e.g., placed or both placed and routed.

The first LUT structure may include a load LUT having a placed location and the second LUT structure may include a load LUT having a same placed location.

The method may also include determining a near timing critical path through the first LUT structure and leaving the near timing critical path of the first LUT structure unchanged in the second LUT structure.

Restructuring the first LUT structure may include determining a plurality of candidate LUT structures according to a plurality of decompositions, wherein each candidate LUT structure is functionally equivalent to the first LUT structure, and selecting one of the plurality of candidate LUT structures as the second LUT structure.

A system for circuit design includes a processor programmed to initiate executable operations. The executable operations may include identifying a timing critical path within a first LUT structure in a circuit design and restructuring the first LUT structure into a functionally equivalent second LUT structure. The second LUT structure may include fewer LUTs serially coupled in the timing critical path than the first LUT structure. The method may include placing the second LUT structure and routing the LUT second structure.

Restructuring the first LUT structure may include performing composition on an expression implemented by the first LUT structure generating a composed expression.

Restructuring the first LUT structure may include determining that a number of inputs for the composed expression is less than a maximum number of inputs for a LUT and selecting a single LUT structure as the second LUT structure.

Restructuring the first LUT structure may include performing decomposition on the composed expression generating a decomposed expression and, responsive to determining that non-constant functions of cofactors of the decomposed expression are either a function or an inversion of the function, selecting a LUT structure for disjoint 2-LUT decomposition as the second LUT structure.

Restructuring the first LUT structure may include performing decomposition on the composed expression generating a decomposed expression and, responsive to determining that cofactors of the decomposed expression have a number of non-constant functions and inversions of the non-constant functions not exceeding $2^s$, where s is a number of shared pins, selecting a LUT structure for non-disjoint 2-LUT decomposition as the second LUT structure.

Restructuring the first LUT structure may include performing decomposition on the composed expression generating a decomposed expression and, responsive to determining that a number of cofactors of the decomposed expression does not exceed $2^n$, where n is an integer value specifying a number of driver LUTs, selecting a LUT structure for a 3-LUT decomposition as the second LUT structure.

In one aspect, the circuit design may be synthesized. In another aspect, the circuit design may be at least placed, e.g., placed or both placed and routed.

The first LUT structure may include a load LUT having a placed location and the second LUT structure may include a load LUT having a same placed location.

The executable operations may also include determining a near timing critical path through the first LUT structure and leaving the near timing critical path of the first LUT structure unchanged in the second LUT structure.

Restructuring the first LUT structure may include determining a plurality of candidate LUT structures according to a plurality of decompositions, wherein each candidate LUT structure is functionally equivalent to the first LUT structure, and selecting one of the plurality of candidate LUT structures as the second LUT structure.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of circuit design, comprising:
   identifying, using a processor, a timing critical path within a first look-up table structure in a circuit design;
   restructuring, using the processor, the first look-up table structure by determining a plurality of candidate look-up table structures according to a plurality of decompositions, wherein each candidate look-up table structure is functionally equivalent to the first look-up table structure, and selecting one of the plurality of candidate look-up table structures as the second look-up table structure;
   wherein the second look-up table structure comprises fewer look-up tables serially coupled in the timing critical path than the first look-up table structure;
   placing, using the processor, the second look-up table structure; and
   routing, using the processor, the second look-up table structure.

2. The method of claim 1, wherein restructuring the first look-up table structure comprises:
   performing composition on an expression implemented by the first look-up table structure generating a composed expression.

3. The method of claim 2, wherein restructuring the first look-up table structure comprises:
   determining that a number of inputs for the composed expression is less than a maximum number of inputs for a look-up table; and
   selecting a single look-up table structure as the second look-up table structure.

4. The method of claim 2, wherein restructuring the first look-up table structure comprises:
   performing decomposition on the composed expression generating a decomposed expression; and
   responsive to determining that non-constant functions of cofactors of the decomposed expression are either a function or an inversion of the function, selecting a look-up table structure for disjoint 2-look-up table decomposition as the second look-up table structure.

5. The method of claim 2, wherein restructuring the first look-up table structure comprises:
   performing decomposition on the composed expression generating a decomposed expression; and
   responsive to determining that cofactors of the decomposed expression have a number of non-constant functions and inversions of the non-constant functions not exceeding $2^s$, where s is a number of shared pins, selecting a look-up table structure for non-disjoint 2-look-up table decomposition as the second look-up table structure.

6. The method of claim 2, wherein restructuring the first look-up table structure comprises:
   performing decomposition on the composed expression generating a decomposed expression; and
   responsive to determining that a number of cofactors of the decomposed expression does not exceed $2^n$, where n is an integer value specifying a number of driver look-up tables, selecting a look-up table structure for a 3-look-up table decomposition as the second look-up table structure.

7. The method of claim 1, wherein the circuit design is at least placed.

8. The method of claim 1, wherein the first look-up table structure comprises a load look-up table having a placed location and the second look-up table structure comprises a load look-up table having a same placed location.

9. The method of claim 1, further comprising:
   determining a near timing critical path through the first look-up table structure; and
   leaving the near timing critical path of the first look-up table structure unchanged in the second look-up table structure.

10. A system, comprising:
   a processor programmed to initiate executable operations comprising:
   identifying a timing critical path within a first look-up table structure in a circuit design;
   restructuring the first look-up table structure by determining a plurality of candidate look-up table structures according to a plurality of decompositions, wherein each candidate look-up table structure is functionally equivalent to the first look-up table structure, and selecting one of the plurality of candidate look-up table structures as the second look-up table structure;

wherein the second look-up table structure comprises fewer look-up tables serially coupled in the timing critical path than the first look-up table structure;

placing the second look-up table structure; and routing the second look-up table structure.

11. The system of claim 10, wherein restructuring the first look-up table structure comprises:

performing composition on an expression implemented by the first look-up table structure generating a composed expression.

12. The system of claim 11, wherein restructuring the first look-up table structure comprises:

determining that a number of inputs for the composed expression is less than a maximum number of inputs for a look-up table; and selecting a single look-up table structure as the second look-up table structure.

13. The system of claim 11, wherein restructuring the first look-up table structure comprises:

performing decomposition on the composed expression generating a decomposed expression; and responsive to determining that non-constant functions of cofactors of the decomposed expression are either a function or an inversion of the function, selecting a look-up table structure for disjoint 2-look-up table decomposition as the second look-up table structure.

14. The system of claim 11, wherein restructuring the first look-up table structure comprises:

performing decomposition on the composed expression generating a decomposed expression; and responsive to determining that cofactors of the decomposed expression have a number of non-constant functions and inversions of the non-constant functions not exceeding $2^s$, where s is a number of shared pins, selecting a look-up table structure for non-disjoint 2-look-up table decomposition as the second look-up table structure.

15. The system of claim 11, wherein restructuring the first look-up table structure comprises:

performing decomposition on the composed expression generating a decomposed expression; and responsive to determining that a number of cofactors of the decomposed expression does not exceed $2^n$, where n is an integer value specifying a number of driver look-up tables, selecting a look-up table structure for a 3-look-up table decomposition as the second look-up table structure.

16. The system of claim 10, wherein the circuit design is at least placed.

17. The system of claim 10, wherein the first look-up table structure comprises a load look-up table having a placed location and the second look-up table structure comprises a load look-up table having a same placed location.

18. The system of claim 10, further comprising:

determining a near timing critical path through the first look-up table structure; and leaving the near timing critical path of the first look-up table structure unchanged in the second look-up table structure.

* * * * *